Sept. 6, 1966 C. C. LARA ETAL 3,270,437
CONTINUOUS OPERATION VEGETABLE MATTER
ESSENCE EXTRACTION APPARATUS
Filed April 22, 1963 3 Sheets-Sheet 1
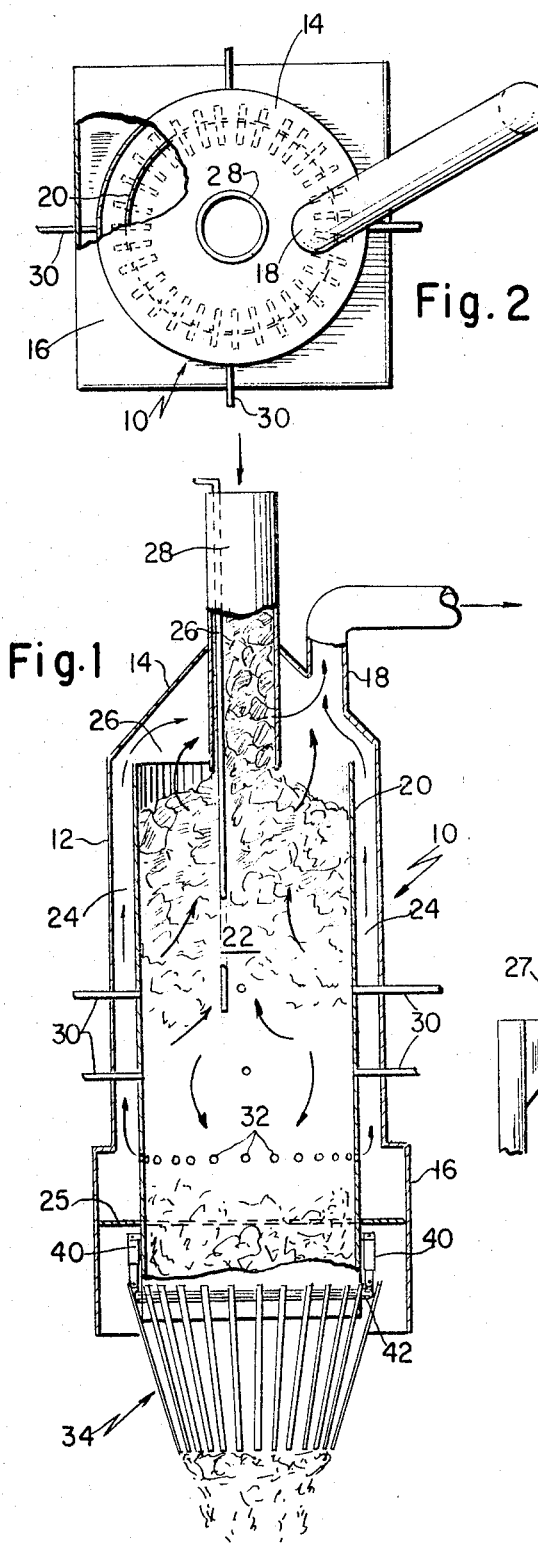
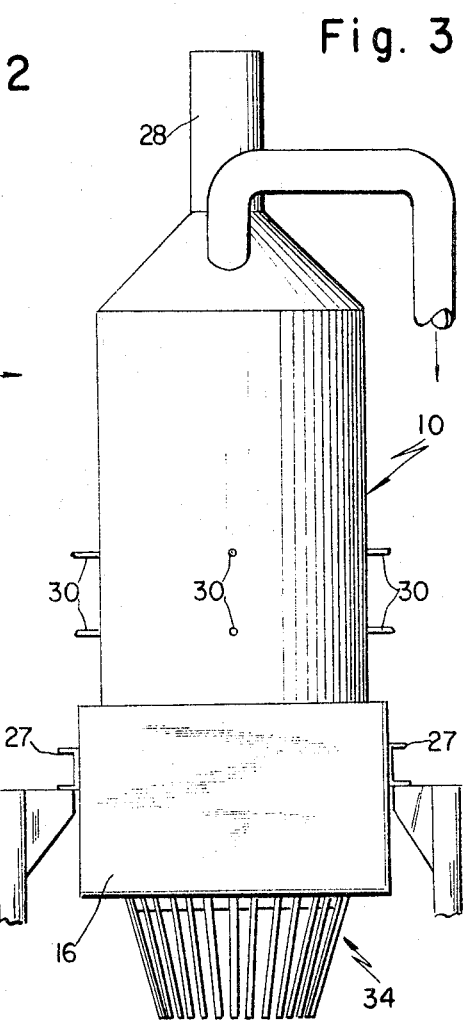
INVENTORS
CARLOS CASTILLO LARA
EDUARDO ANTONIO CASTILLO COFINO
BY Robertson & Smythe
ATTORNEYS

United States Patent Office 3,270,437
Patented Sept. 6, 1966

3,270,437
CONTINUOUS OPERATION VEGETABLE MATTER ESSENCE EXTRACTION APPARATUS
Carlos Castillo Lara and Eduardo Antonio Castillo Cofino, both of 2nd Ave. A 13–34, Zona 1, Guatemala, Guatemala
Filed Apr. 22, 1963, Ser. No. 274,645
6 Claims. (Cl. 34—168)

This invention relates in general to the extraction of essence from vegetable matter and more specifically it relates to an apparatus for causing the continuous extraction of such essence from vegetable matter.

The invention provides an apparatus wherein the essence of vegetable matter may be extracted in a continuous process. Accordingly, there is a vertically elongated evaporator vessel having a top portion arranged to collect vapor and entrained evaporated essence products from the vegetable matter flowing therein and pass vapor carried essence products to an outlet therefrom. A plate means is disposed within the walls of the vessel and coacts with the walls to form an interior vertically elongated material evaporation chamber which is open at the bottom and also forms an annular vapor riser which is sealed at the bottom and open directly to the vapor collection portion of the vessel. A feed products inlet is provided into the upper portion of the interior chamber and an adjustable orifice is scross the opening from the bottom of the evaporation chamber and adapted to vary the discharge area thereof. Steam nozzles are arranged to introduce steam into the feed products flowing into the interior of the chamber and a vapor outlet in the lower portion of the interior chamber is directly connected to the riser so as to allow the combined steam and evaporated essence oils to flow outwardly therefrom and up the riser The invention further provides a means for varying the area of the orifice at the bottom of the interior chamber according to the flow requirements of the vegetable matter from which the essence is extracted.

The adjustable orifice may be composed of a plurality of closely spaced lath-like members pivotally mounted intermediate their length to form a generally cone shaped structure which is adjustable by pivoting to various slope angles from the highest where the orifice is fully opened to the lowest where it is of a minimum area.

The invention also contemplates that the vapor leaving the evaporator with the entrained essence products be taken into a surface condenser where both the essence and the vapor are condensed and subsequently separated in a continuous process.

The various features of novelty which characterize the invention are pointed out with particularity in the claims annexed to and forming a part of his specification, but for a beter understanding of the invention, its operating advantages and specific objects obtained by its use, reference should be had to the detailed explanations of the preferred embodiment of the invenion along with the illustrations in the accompanying drawings.

In the drawings:

FIGURE 1 is a vertical section of the evaporator of the present invention;

FIGURE 2 is a plan view of FIGURE 1;

FIGURE 3 is a side elevation of FIGURE 1;

Figure 4:
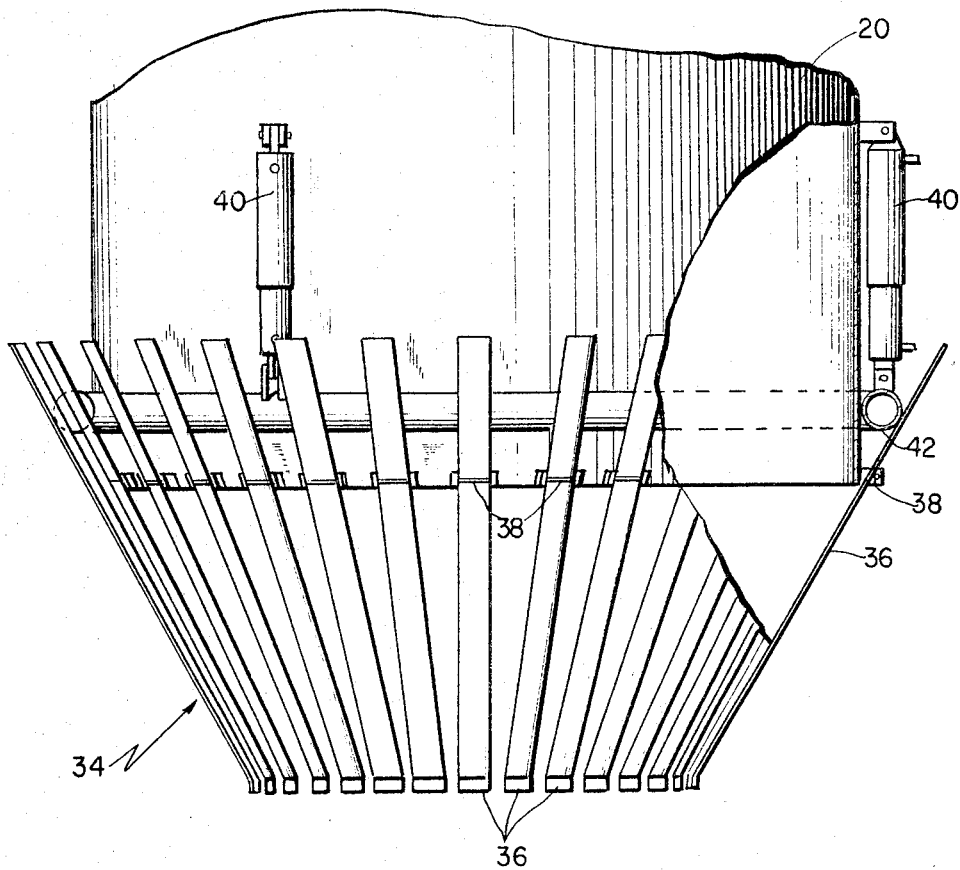
FIGURE 4 is a greatly enlarged side elevation detail of the outlet portion of the evaporator.

With reference to FIGURES 1, 2 and 3, a vertically elongated evaporator vessel 10 has a vertical cylinder 12 with a conical top portion 14 arranged for the collection of vapor and entrained evaporator essence products. At the bottom of the evaporator 10 there is a rectangular shaped portion 16 joined to the cylinder 12 in a fluid tight relationship. There is a vapor outlet 18 from the top portion 14 of the evaporator. Within the cylinder 12 there is a cylindrical plate means 20 vertically elongated to form an interior material evaporation chamber 22 which has an opening at the bottom and, due to the fact that it is spaced from the cylinder wall 12, forms an annular vapor riser 24. The interior cylinder 20 is sealed at the bottom by being joined to the bottom portion of the rectangular box 16 by an annular plate 25. The top of the riser 24 joins directly to the vapor collection space within the conical top portion 14. The inner chamber 22 is open at the top and into its center there is fixed a pipe 28 acting as a feed products inlet to the interior chamber 22.

The evaporator 10 is provided with channel members 27 on the box 16, for attachment to any convenient supporting structure.

A plurality of nozzles 30 are disposed about the midportion of the evaporator 10 and arranged to pass through the riser 24 and discharge steam into the interior chamber 22. These vapor inlet nozzles may be disposed at spaced circumferential positions as desired and, as illustrated in FIGURES 1 and 3, may be disposed at spaced vertical positions to assure a uniform distribution of the steam within the chamber 22. Additional steam is admitted to the chamber 22 by a steam line 26. At a position below the point of introduction of the vapor through the nozzles 30, the cylinder 20 is provided with a multiplicity of vapor outlets 32 shown in the illustration as orifices. These outlets are placed at a position below the vapor nozzles 30 to allow some of the vapor to flow downwardly in the treated products and then to be passed outwardly into the riser along with the entrained essence products which have been evaporated from the vegetable products within the evaporator. The principal portion of the vapor and entrained essence flows upwardly through the top of chamber 22 and into the outlet 18.

At the bottom portion of the evaporator 10, an adjustable orifice means 34 is disposed across the bottom opening from the interior chamber 22, the adjustable orifice having the function to adjustably vary the discharge area from the interior 22 as may be necessary in carrying out the process as described in more detail hereinafter.

FIGURE 4 shows in greater detail this adjustable orifice means attached to the end of the interior cylinder 20, where it projects beyond the bottom of the interior riser 24 and below the rectangular box 16 (see FIGURE 1). The adjustable orifice 34 is made up of a multiplicity of closely spaced lath-like members 36 which are mounted intermediate their length on pivots 38 which in turn are on the bottom end of the interior cylinder 20. As illustrated in the drawing, the lath-like members 36 consist of metal members in much the same manner as a piece of a leaf spring. When so mounted on the pivots 38, the members 36, if moved in unison, will form a generally cone shaped structure which is adjustable to various slope angles from the highest where there is an opening in the center forming an orifice fully opened to the lowest where the ends of the members 36 abut and the orifice opening is at a minimum.

The members 38 are moved in unison by means which consists of a plurality of hydraulic actuators 40 mounted on the exterior of the interior cylinder 20 and operating on the toroidal member 42 which is in tangential contact with the inside of the members 36 above the pivot point. Accordingly, upon command, the hydraulic actuators 40 may extend downwardly pressing the toroid 42 against the members 36 and pivoting them on the pivots 38 to cause the slope angle to be decreased and the orifice opening to be reduced. Upon another command, the actuator may be withdrawn upwardly while the vertically upward movement of the ends of the actuator allows the members 36, by the action of gravity and the force of the treatment materials within the evaporator 22, to move to a vertical position about the pivot 38 and thus assume a greater slope angle. The operation of the adjustable orifice 34 in relation to the process will be described in greater detail hereinafter.

Figure 5:
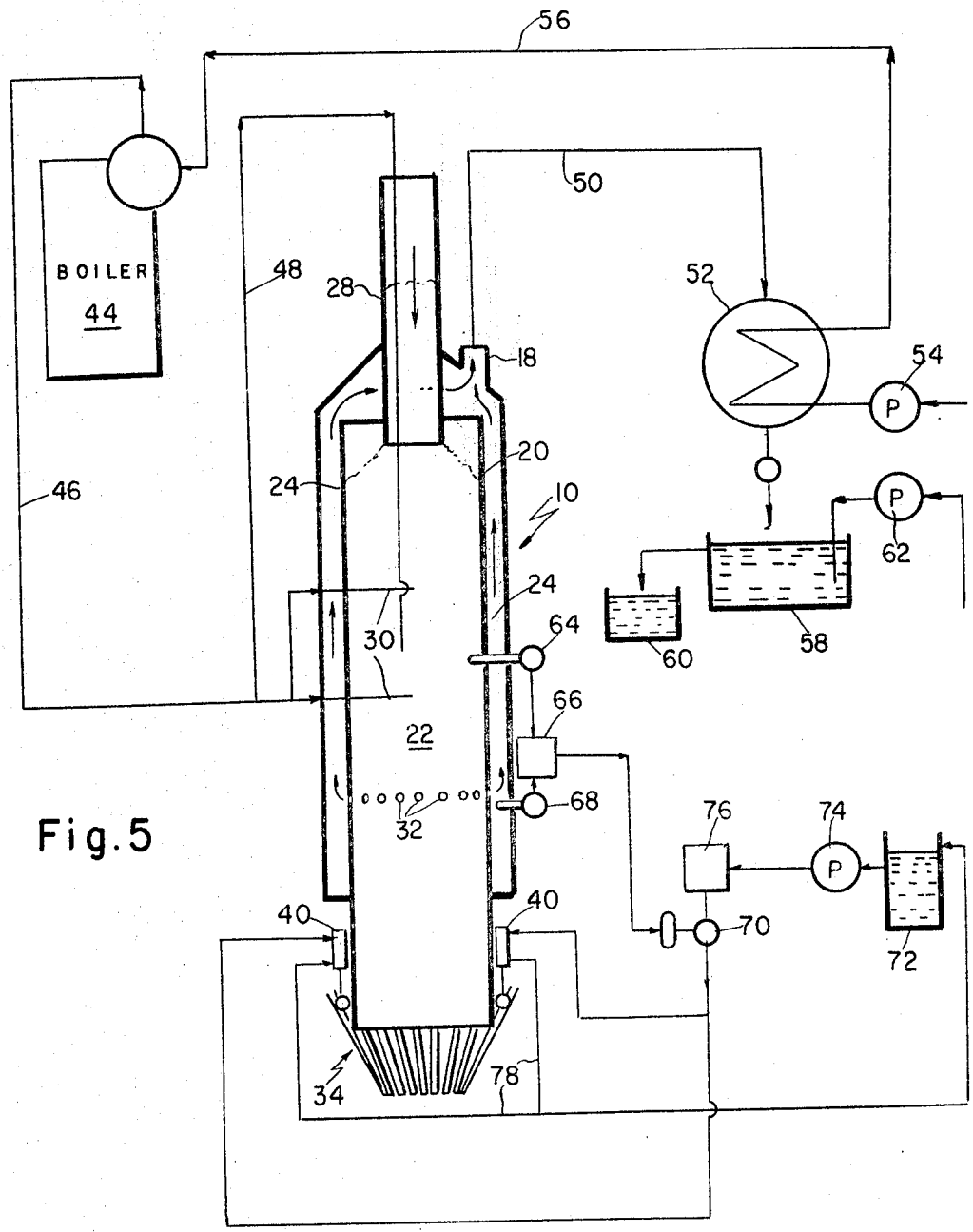
FIGURE 5 is a schematic diagram of the extraction system.

With reference to FIGURE 5, the function of the evaporator 10 can best be illustrated by describing the flow system in which it is situated. Vegetable matter, such as grass, flowers, tubulous plants and other like products, broadly classified as vegetable matter in which there lies a desirable essence, are inserted into the evaporator through the inlet 28 falling downwardly onto the grate-like structure formed by the adjustable orifice 34 in its minimum opening or low slope position. Steam is supplied from a boiler 44 through a line 46 to the nozzles 30 which supply vapor into the interior chamber 22 of the evaporator and heat the vegetable matter being treated therein. For convenience, and to assist in the preheating of the vegetable products, some portion of the steam may be added through the inlet 28 by a line 48, in such quantities as may be desirable or necessary. Due to the compression of the vertical height inherent within the vegetable matter being treated in the chamber 22, the vapor therein will tend to flow down and then radially outwardly through the orifices 32 of the evaporator into the riser 24 carrying with it the evaporated essences, usually in the form of oils from the vegetable matter. The increasing density of the already treated vegetable matter between the orifice 34 and the vapor outlet holes 32, blocks the vapor from flowing out through the orifice and makes the path of least resistance of the vapor and entrained essence through such holes 32. The vapor and entrained essence pass up the riser 24 into the top portion of the evaporator and are carried by a line 50 into a surface condenser 52, the condenser 52 being supplied cooling water from pump 54 through the heat transfer surface therein with this water subsequently being passed through the line 56 as feed water to the boiler 44.

The surface condenser causes the sudden collapse of the vapor, thereby creates a lower pressure area tending to increase the flow rate of the vapor and entrained essence through the line 50. The condensed products pass into a separator means 58 which is represented as a tank in which the essence, in the form of oil, is drawn off the top into a collection tank 60 and condensed water is pumped out from the lower portion of the tank by a pump 62 or syphon. It is, of course, obvious that any of the well known forms of separation may be utilized to take the essence from the condensed water, such as centrifugal separators, screens, chemicals, selective evaporation and the like.

In order to provide a most economic arrangement, the evaporator should be operated with the continuous flow therethrough of vegetable matter during its treatment. Thus, the variable orifice 34 will be changed so as to provide for a greater or lesser flow rate of the vegetable matter conditioned on the yield of essence. In most instances, however, the yield of essence will be within acceptable limits and the flow rate of the vegetable matter within the interior treatment chamber 22 will be largely varied to assure that there is a proper quantity of steam flowing through the evaporator. The inconsistency of flow attendant with fibrous materials, which composes much vegetable matter, will cause variations of density at the low portion of the chamber 22. Accordingly, the adjustable orifice 34 must be varied as desired to provide a continuous flow of vegetable matter through the unit and constant flow of oil essence.

The adjustable orifice 34 may be controlled by hand, or if desired, by an automatic system. An exemplified form of automatic system would comprise a pressure senser 64 receiving a pressure impulse from the interior of the chamber 22 near the position of the steam inlet nozzles 30 is connected into a controller 66 which also receives a vapor pressure in the riser section 24 from a second senser 68. A signal from the controller 66, resulting from the differential pressure, is passed to a control valve 70 which varies the hydraulic pressure in a hydraulic system and which in turn causes the operation of the actuators 40. As previously described, the actuators 40 vary the slope angle of the lath-like members 38 that make up the adjustable orifice to vary the flow rate therein.

The hydraulic system may be comprised of a pump tank 72 from which a pump 74 takes fluid and pumps it into a pressure chamber 76. The hydraulic oil flows out of the pressure chamber 76 through the valve 70 and into the top of the actuators 40. The actuators may contain a discharge line 78 returning the oil to the pump tank 72 with the flow rate of the hydraulic oil and therefore the differential pressure determining the amount of extension of the actuators 40. Alternately, other hydraulic systems may be used in which the actuators 40 are extended by the imposition of an oil pressure load against a spring. Accordingly, the control valve 70 may simply be a signal into a controller for the pressure transmission system.

The continuous extraction system described herein is made possible by the overall configuration of the evaporator, the regulation of which is greatly assisted by the variability of the adjustable orifice 34. The apparatus is one in which essence is continuously extracted and passed to a surface condenser for subsequent separation and is based on the recognition that the vegetable matter may be treated while continuously flowing and being regulated by an adjustable orifice.

The particular construction of the adjustable orifice being composed of a plurality of lath-like pivoted members makes it possible to operate on the relatively fibrous vegetable matter without such vegetable matter hanging up on the orifice causing it to become inoperative. Moreover, the cage-like appearance of the regulator or orifice allows any agglomeration of vegetable matter to be cleared easily.

While in accordance with the provisions of the statutes there has been illustrated and described herein a specific form of the invention now known, those skilled in the art will understand that changes may be made in the form of the product or the method of making it disclosed without departing from the spirit of the invention covered by the claims and that certain features of the invention may some times be used to advantage without a corresponding use of other features.

What is claimed is:

1. Apparatus for the extraction of essence from vegetable matter by evaporation and comprising a vertically elongated evaporator vessel having a top portion arranged for the collection of vapor and entrained evaporated essence products, a vapor outlet from said top portion, cylindrical plate means coacting with and spaced from the walls of said vessel to form an interior vertically elongated material evaporation chamber having an opening at the bottom and an annular vapor riser and opening directly to said top collection portion of said vessel, annular plate means disposed in the lower portion of said vapor riser to seal the bottom thereof, a vegetable matter feed products inlet to the upper portion of said interior vertically elongated chamber, adjustable orifice means disposed across said bottom opening of said interior chamber and adapted to vary the discharge flow rate of the treated vegetable matter therefrom, steam nozzles in communication with said interior evaporation chamber arranged to introduce steam into said feed products, and a vapor outlet in the lower portion of said interior chamber directly in communication with said annular riser and in the lower portion thereof.

2. Apparatus for the extraction of essence from vegetable matter by evaporation and comprising a vertically elongated evaporator vessel having a top portion arranged for the collection of vapor and entrained evaporator essence products, a vapor outlet from said top portion, cylindrical plate means coacting with and spaced from the walls of said vessel to form an interior vertically elongated material evaporation chamber having an opening at the bottom and an annular vapor riser and opening directly to said top collection portion of said vessel, annular plate means disposed in the lower portion of said vapor riser to seal the bottom thereof, a vegetable matter feed products inlet to the upper portion of said interior vertically elongated chamber, adjustable orifice means disposed across said bottom opening of said interior chamber and adapted to vary the discharge flow rate of the treated vegetable matter therefrom, means for adjusting said orifice means, steam nozzles in communication with said interior evaporation chamber arranged to introduce steam into said feed products, and a vapor outlet in the lower portion of said interior chamber directly in communication with said annular riser and in the lower portion thereof.

3. Apparatus for the extraction of essence from vegetable matter by evaporation and comprising a vertically elongated evaporator vessel having a top portion arranged for the collection of vapor and entrained evaporated essence products, a vapor outlet from said top portion, cylindrical plate means coacting with and spaced from the walls of said vessel to form an interior vertically elongated material evaporation chamber having an opening at the bottom and an annular vapor riser and opening directly to said top collection portion of said vessel, annular plate means disposed in the lower portion of said vapor riser to seal the bottom thereof, a vegetable matter feed products inlet to the upper portion of said interior vertically elongated chamber, adjustable orifice means disposed across said bottom opening of said interior chamber and adapted to vary the discharge flow rate of the treated vegetable matter therefrom, said orifice means including a plurality of closely spaced lath-like members pivotally mounted intermediate their length to form a generally cone shaped structure adjustable to various slope angles from the highest where said orifice is fully open to the lowest where such orifice is of a minimum area, means for selectively positioning by pivoting said members in unison, steam nozzles in communication with said interior evaporation chamber arranged to introduce steam into said feed products, and a vapor outlet in the lower portion of said interior chamber directly in communication with said annular riser and in the lower portion thereof.

4. Apparatus for the extraction of essence from vegetable matter by evaporation and comprising a vertically elongated evaporator vessel having a top portion arranged for the collection of vapor and entrained evaporated essence products, a vapor outlet from said top portion, cylindrical plate means coacting with and spaced from the walls of said vessel to form an interior vertically elongated material evaporation chamber having an opening at the bottom and an annular vapor riser and opening directly to said top collection portion of said vessel, annular plate means disposed in the lower portion of said vapor riser to seal the bottom thereof, a vegetable matter feed products inlet to the upper portion of said interior vertically elongated chamber, adjustable orifice means disposed across said bottom opening of said interior chamber and adapted to vary the discharge flow rate of the treated vegetable matter therefrom, said orifice means including a plurality of closely spaced lath-like members pivotally mounted intermediate their length to form a generally cone shaped structure adjustable to various slope angles from the highest where said orifice is fully open to the lowest where such orifice is fully closed, a ring tangentially contacting the inside of said members above said pivots, means for selectively positioning said ring vertically, control means receiving indications of feed product flow rate through said orifice and regulating said selective positioning means in accordance with a predetermined desired flow rate of feed product, steam nozzles in communication with said interior evaporation chamber arranged to introduce steam into said feed products, and a vapor outlet in the lower portion of said interior chamber directly in communication with said annular riser and in the lower portion thereof.

5. Apparatus for the extraction of essence from vegetable matter by evaporation and comprising a vertically elongated evaporator vessel having a top portion arranged for the collection of vapor and entrained evaporated essence products, a vapor outlet from said top portion, cylindrical plate means coacting with and spaced from the walls of said vessel to form an interior vertically elongated material evaporation chamber having an opening at the bottom and an annular vapor riser and opening directly to said top collection portion of said vessel, annular plate means disposed in the lower portion of said vapor riser to seal the bottom thereof, a vegetable matter feed products inlet to the upper portion of said interior vertically elongated chamber, adjustable orifice means disposed across said bottom opening of said interior chamber and adapted to vary the discharge flow rate of the treated vegetable matter therefrom, means for adjusting said orifice means, steam nozzles in communication with said interior evaporation chamber arranged to introduce steam into said feed products, a vapor outlet in the lower portion of said interior chamber directly in communication with said annular riser and in the lower portion thereof, a surface condenser communicating with said vapor outlet receiving said vapor and entrained evaporated essence products and condensing same, and a separator communicating with said condenser receiving said condensate and separating the condensed essence products from the water.

6. Apparatus for the extraction of essence from vegetable matter by evaporation and comprising a vertically elongated evaporator vessel having a top portion arranged for the collection of vapor and entrained evaporated essence products, a vapor outlet from said top portion, cylindrical plate means coacting with and spaced from the walls of said vessel to form an interior vertically elongated material evaporation chamber having an opening at the bottom and an annular vapor riser and opening directly to said top collection portion of said vessel, annular plate means disposed in the lower portion of said vapor riser to seal the bottom thereof, a vegetable matter feed products inlet to the upper portion of said interior vertically elongated chamber, adjustable orifice means disposed across said bottom opening of said interior chamber and adapted to vary the discharge flow rate of the treated vegetable matter therefrom, means for adjusting said orifice means responsive to the flow rate of said feed products through said orifice means, steam heating means in the interior of said chamber to heat said vegetable matter and evaporate essence vapors therefrom, a vapor outlet from the lower portion of said interior chamber directly to said riser in the lower portion thereof, a surface condenser communicating with said vapor outlet receiving said vapor and entrained evaporated essence products and condensing same, and a separator communicating with said condenser receiving said condensate and separating the condensed essence products from the water.

References Cited by the Examiner

UNITED STATES PATENTS

| | | | |
|---|---|---|---|
| 484,099 | 10/1892 | Jewell | 34—168 |
| 2,028,395 | 1/1936 | Keoughan | 34—167 |
| 2,386,670 | 10/1945 | Evans | 34—167 |
| 2,423,411 | 7/1947 | Simpson | 34—167 |
| 2,926,489 | 3/1960 | Halford et al. | 239—455 |

FOREIGN PATENTS 154,408   12/1953   Great Britain.

FREDERICK L. MATTESON, Jr., *Primary Examiner.*
NORMAN YUDKOFF, WILLIAM F. O'DEA,
*Examiners.*
B. L. ADAMS, F. E. DRUMMOND,
*Assistant Examiners.*